United States Patent
Panje et al.

(10) Patent No.: US 11,558,303 B2
(45) Date of Patent: Jan. 17, 2023

(54) PRIORITIZED PROTOCOL MESSAGING

(71) Applicant: ARRIS Enterprises LLC, Suwanee, GA (US)

(72) Inventors: Krishna Prasad Panje, Bengaluru (IN); Lakshmi Arunkumar, Bangalore (IN)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

(21) Appl. No.: 17/411,454

(22) Filed: Aug. 25, 2021

(65) Prior Publication Data
US 2022/0116329 A1 Apr. 14, 2022

Related U.S. Application Data

(60) Provisional application No. 63/089,216, filed on Oct. 8, 2020.

(51) Int. Cl.
*H04L 47/2441* (2022.01)
*H04L 43/10* (2022.01)
(Continued)

(52) U.S. Cl.
CPC .......... *H04L 47/2441* (2013.01); *H04L 43/10* (2013.01); *H04L 47/2408* (2013.01); *H04W 28/10* (2013.01)

(58) Field of Classification Search
CPC ..... H04L 47/2441; H04L 43/08; H04L 43/10; H04L 43/12; H04L 47/2408; H04L 47/2466; H04W 28/02; H04W 28/10; H04W 28/0247; H04W 28/0236; H04W 28/24
See application file for complete search history.

(56) References Cited

U.S. PATENT DOCUMENTS

| 2002/0083169 | A1 | 6/2002 | Aki et al. |
| 2004/0057459 | A1* | 3/2004 | Sharony ............... H04L 47/527 370/468 |

(Continued)

OTHER PUBLICATIONS

International Search Report and Written Opinion of International Searching Authority dated Dec. 10, 2021 International (PCT) Application No. PCT/US2021/047495.

*Primary Examiner* — Mohamed A Kamara
(74) *Attorney, Agent, or Firm* — Wenderoth, Lind & Ponack, L.L.P.

(57) ABSTRACT

A Wi-Fi APD is configured to tag internet protocol data with a first priority level and a second priority level that is higher than the first priority level. The network controller contains a memory that contains a channel bandwidth threshold value. The network controller contains a processor configured to execute instructions that cause the network controller to: periodically poll the Wi-Fi APD; periodically receive poll responses from the Wi-Fi APD; determine whether channel bandwidth is greater than the stored channel bandwidth threshold value; determine whether the response time of the poll responses is greater than the polling period; and instruct the Wi-Fi APD to tag internet protocol data with the second priority level when at least one of the channel bandwidth is less than the channel bandwidth threshold value and the response time is greater than the period of the first frequency.

12 Claims, 8 Drawing Sheets

(51) Int. Cl.
*H04L 47/2408* (2022.01)
*H04W 28/10* (2009.01)

(56) References Cited

U.S. PATENT DOCUMENTS

| | | |
|---|---|---|
| 2005/0032535 A1* | 2/2005 | Shitama ............... H04W 48/16 455/512 |
| 2007/0195742 A1 | 8/2007 | Erdman et al. |
| 2009/0182874 A1 | 7/2009 | Morford et al. |
| 2014/0105060 A1 | 4/2014 | Baillargeon |

* cited by examiner

PRIORITIZED PROTOCOL MESSAGING

BACKGROUND

Embodiments of the present disclosure relate to prioritizing protocol data in a wireless network.

SUMMARY

Aspects of the present disclosure are drawn to a network controller for use with a first Wi-Fi access point device (APD) and a client device, the client device being associated with the first Wi-Fi APD. The first Wi-Fi APD is configured to tag internet protocol data with a first priority level tag that indicates a first level of priority, and to tag internet protocol data with a second priority level tag that indicates a second level of priority that is higher than the first level of priority. The network controller includes a memory having a channel bandwidth threshold value stored therein and a processor configured to execute instructions stored on the memory to cause the network controller to: periodically poll the first Wi-Fi APD at a first frequency; periodically receive corresponding poll responses from the first Wi-Fi APD in response to the periodic polling; determine whether a channel bandwidth, based on the received corresponding poll responses, is greater than the channel bandwidth threshold value; determine whether a response time of a response from the first Wi-Fi APD is greater than a period of the first frequency; and instruct the first Wi-Fi APD to tag internet protocol data to be transmitted to the network controller with the second priority level tag when at least one of the channel bandwidth is less than the channel bandwidth threshold value and the response time is greater than the period of the first frequency.

In some embodiments, the processor is configured to execute instructions stored on the memory to additionally cause the network controller to tag internet protocol data to be transmitted to the first Wi-Fi APD with the second priority level tag when at least one of the channel bandwidth is less than the channel bandwidth threshold value and the response time is greater than the period of the first frequency.

In some embodiments, the processor is configured to execute instructions stored on the memory to additionally cause the network controller to instruct the first Wi-Fi APD to tag internet protocol data to be transmitted to the network controller via a wireless multi-media (WMM) quality of service (QoS) mechanism. The first priority level tag includes one of the group consisting of: a background level tag having a background level of priority, a best effort level tag having a best effort level of priority that is higher than the background level of priority, and a video level tag having a video level of priority that is higher than the best effort level of priority. The second priority level tag includes one of the group consisting of: the best effort level tag, and the video level tag, and a voice level tag having a voice level of priority that is higher than the video level of priority.

In some embodiments, the processor is configured to execute instructions stored on the memory to additionally cause the network controller to instruct the first Wi-Fi APD to tag internet protocol data to be transmitted to the network controller via a differentiated services code point (DSCP) mechanism.

Other aspects of the present disclosure are drawn to a method of using a network controller with a first Wi-Fi APD and a client device, the client device being associated with the first Wi-Fi APD. The first Wi-Fi APD is configured to tag internet protocol data with a first priority level tag that indicates a first level of priority, and to tag internet protocol data with a second priority level tag that indicates a second level of priority that is higher than the first level of priority. The method includes: periodically polling, via a processor configured to execute instructions stored on a memory having a channel bandwidth threshold value stored therein, the first Wi-Fi APD at a first frequency; periodically receiving, via the processor, corresponding poll responses from the first Wi-Fi APD in response to the periodic polling; determining, via the processor, whether a channel bandwidth, based on the received corresponding poll responses, is greater than the channel bandwidth threshold value; determining, via the processor, whether a response time of a response from the first Wi-Fi APD is greater than a period of the first frequency; and instructing, via the processor, the first Wi-Fi APD to tag internet protocol data to be transmitted to the network controller with the second priority level tag when at least one of the channel bandwidth is less than the channel bandwidth threshold value and the response time is greater than the period of the first frequency.

In some embodiments, the method further includes tagging, via the processor, internet protocol data to be transmitted to the first Wi-Fi APD with the second priority level tag when at least one of the channel bandwidth is less than the channel bandwidth threshold value and the response time is greater than the period of the first frequency.

In some embodiments, the method further includes instructing the first Wi-Fi APD to tag internet protocol data to be transmitted to the network controller via a WMM QoS mechanism. The first priority level tag includes one of the group consisting of: a background level tag having a background level of priority, a best effort level tag having a best effort level of priority that is higher than the background level of priority, and a video level tag having a video level of priority that is higher than the best effort level of priority. The second priority level tag includes one of the group consisting of: the best effort level tag, and the video level tag, and a voice level tag having a voice level of priority that is higher than the video level of priority.

In some embodiments, the method further includes instructing the first Wi-Fi APD to tag internet protocol data to be transmitted to the network controller via a DSCP mechanism.

Other aspects of the present disclosure are drawn to a non-transitory, computer-readable media having computer-readable instructions stored thereon, the computer-readable instructions being capable of being read by a network controller with a first Wi-Fi APD and a client device, the client device being associated with the first Wi-Fi APD, the first Wi-Fi APD being configured to tag internet protocol data with a first priority level tag that indicates a first level of priority, and to tag internet protocol data with a second priority level tag that indicates a second level of priority that is higher than the first level of priority. The computer-readable instructions are capable of instructing the network controller to perform the method including: periodically polling, via a processor configured to execute instructions stored on a memory having a channel bandwidth threshold value stored therein, the first Wi-Fi APD at a first frequency; periodically receiving, via the processor, corresponding poll responses from the first Wi-Fi APD in response to the periodic polling; determining, via the processor, whether a channel bandwidth, based on the received corresponding poll responses, is greater than the channel bandwidth threshold value; determining, via the processor, whether a response time of a response from the first Wi-Fi APD is greater than a period of the first frequency; and instructing, via the processor, the first Wi-Fi APD to tag internet protocol data to be transmitted to the network controller with the second priority level tag when at least one of the channel bandwidth is less than the channel bandwidth threshold value and the response time is greater than the period of the first frequency.

In some embodiments, the computer-readable instructions are capable of instructing the network controller to perform the method further including tagging, via the processor, internet protocol data to be transmitted to the first Wi-Fi APD with the second priority level tag when at least one of the channel bandwidth is less than the channel bandwidth threshold value and the response time is greater than the period of the first frequency.

In some embodiments, the computer-readable instructions are capable of instructing the network controller to perform the method wherein the instructing, via the processor, the first Wi-Fi APD to tag internet protocol data to be transmitted to the network controller includes instructing the first Wi-Fi APD to tag internet protocol data to be transmitted to the network controller via a WMM QoS mechanism. The first priority level tag includes one of the group consisting of: a background level tag having a background level of priority, a best effort level tag having a best effort level of priority that is higher than the background level of priority, and a video level tag having a video level of priority that is higher than the best effort level of priority. The second priority level tag includes one of the group consisting of: the best effort level tag, and the video level tag, and a voice level tag having a voice level of priority that is higher than the video level of priority.

In some embodiments, the computer-readable instructions are capable of instructing the network controller to perform the method wherein the instructing, via the processor, the first Wi-Fi APD to tag internet protocol data to be transmitted to the network controller includes instructing the first Wi-Fi APD to tag internet protocol data to be transmitted to the network controller via a DSCP mechanism.

BRIEF SUMMARY OF THE DRAWINGS

The accompanying drawings, which are incorporated in and form a part of the specification, illustrate example embodiments and, together with the description, serve to explain the principles of the present disclosure. In the drawings.

DETAILED DESCRIPTION

Today's homes and offices often have wireless communications networks that connect client devices and internet resources. The simplest wireless network employs a single gateway, or network controller, that connects to all client devices, resulting in a network with limited range. More recent innovations, including wireless extenders and mesh network devices, enable wireless networks to be expanded in range and flexibility. Networks can be extended by simply adding access point devices; client devices in such networks can roam freely in the coverage area, connecting to the access point device with the best signal or performance.

During certain situations, for example when there is heavy network traffic or when a client device is connected through multiple hops, network traffic can slow down. The time taken for a data packet to flow from a network controller to the client device, or vice versa, can lengthen. This slowdown can impact protocol data such as poll packets and poll response packets, which are essential to the management and operation of the wireless network, and thus can impact the overall performance and experience of client devices on the network.

What is needed is a system and method for improving the response time of protocol data in a wireless network.

A system and method in accordance with the present disclosure prioritizes protocol data in a wireless network with multiple access point devices.

In accordance with the present disclosure, a network controller periodically sends poll packets to and receives poll response packets from access point devices in a wireless network. The network controller monitors the response times of the poll response packets. The network controller also monitors channel bandwidth on the wireless network. If response times exceed a certain period or channel bandwidth falls below a threshold value, the network controller and access point devices increase the priority of protocol data by tagging the protocol data with a higher priority level. When response times or channel bandwidth return to acceptable levels, priority tags are reset to their previous or default levels.

An example system and method for prioritizing protocol data in a wireless network with multiple access point devices in accordance with aspects of the present disclosure will now be described in greater detail with reference to FIGS. 1-7.

Figure 1:
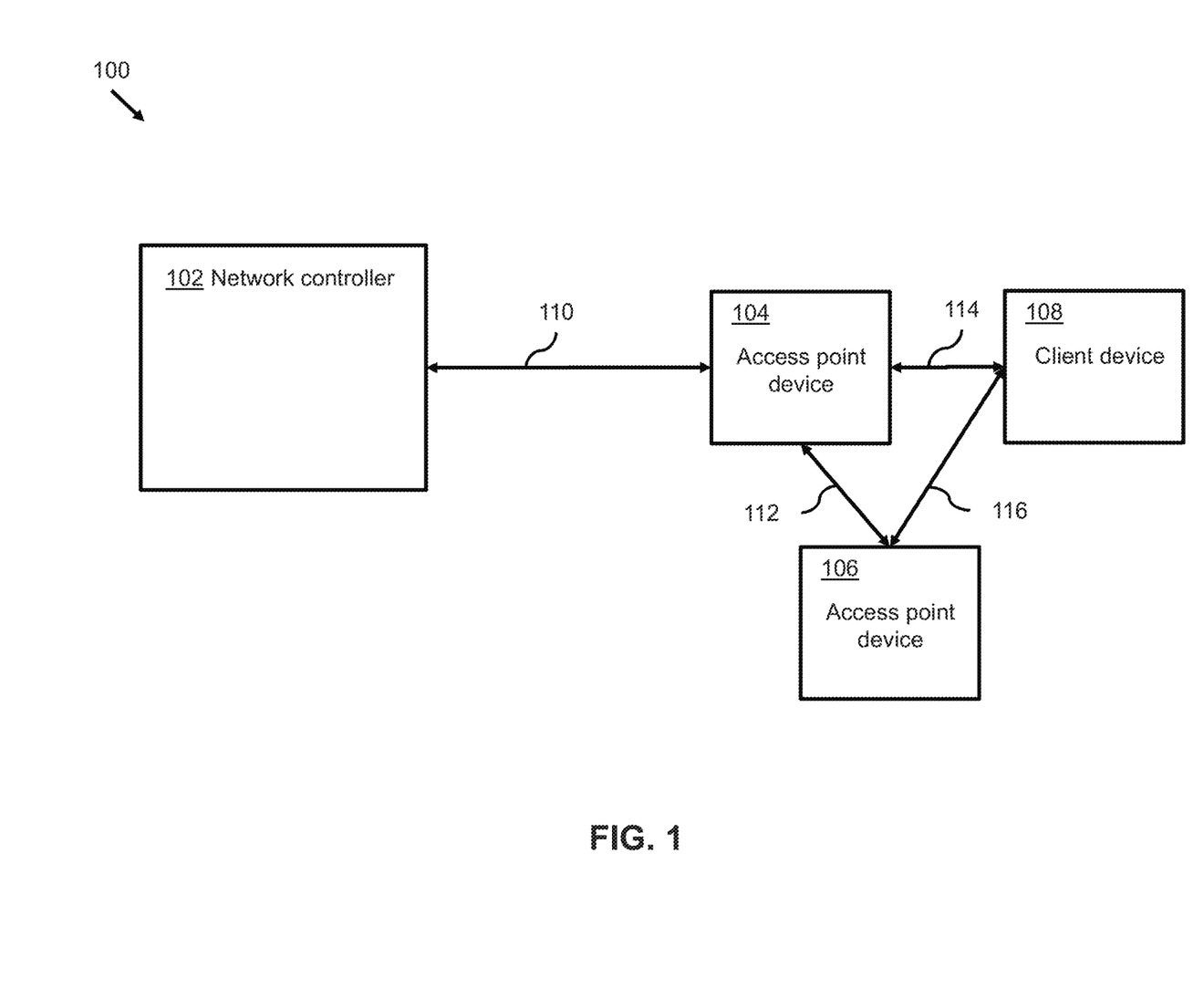
FIG. 1 illustrates a wireless network.

FIG. 1 illustrates wireless network 100.

As shown in the figure, wireless network 100 includes network controller 102, access point devices 104 and 106, and client device 108. Network controller 102 is arranged to communicate to access point device 104 by way of communication channel 110. Access point device 104 is arranged to communicate to access point device 106 by way of communication channel 112. Client device 108 is arranged to communicate to access point device 104 by way of communication channel 114, or to access point device 106 by way of communication channel 116.

Network controller 102 is any device or method that establishes wireless network 100, such that access point device 104 and 106 and client device 108 are able to communicate with home network controller 102. In this non-limiting example, network controller 102 may be a gateway, a router, or a root access point device that establishes wireless network 100 using the Wi-Fi protocol. The term Wi-Fi as used herein may be considered to refer to any of Wi-Fi 4, 5, 6, 6E, or any variation thereof.

Access point devices 104 and 106 are any devices or methods that extend capabilities and coverage area of wireless network 100. In this non-limiting example, access point devices 104 and 106 may be Wi-Fi extenders or Wi-Fi mesh network devices.

Client device 108 is any device or method that presents content and accepts inputs from users. In this non-limiting example, client device 108 may be a smart phone, a tablet, a personal computer, a TV set-top box, a videogame console, or a smart media device.

Communications channels 110, 112, 114, and 116 are any device or method that facilitate communications between devices or networks. In this non-limiting example, communications channels 110, 112, 114, and 116 are Wi-Fi channels.

Figure 2A:
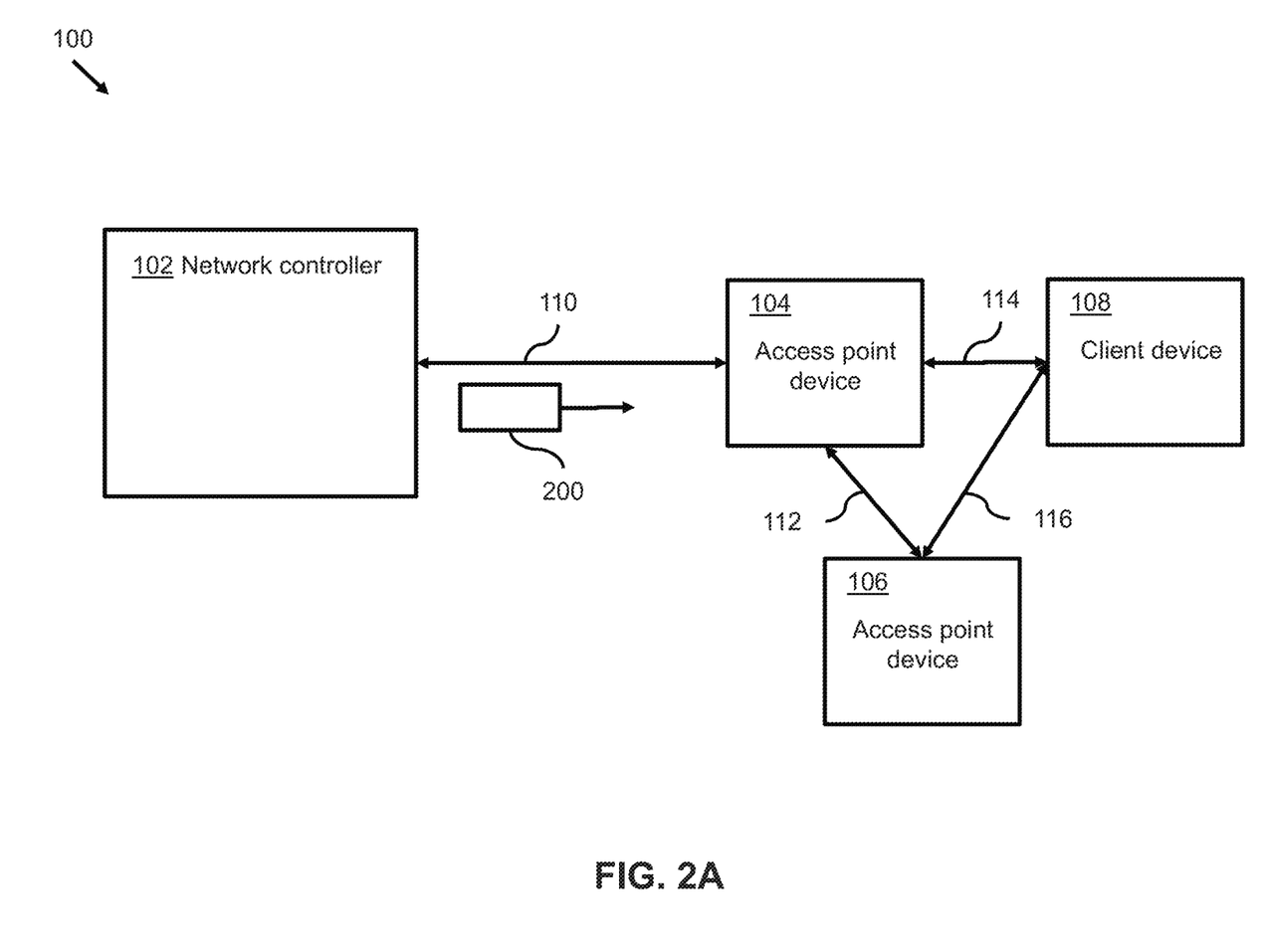
FIGS. 2A-B illustrate a flow of a poll packet and a poll response packet.
Figure 2B:
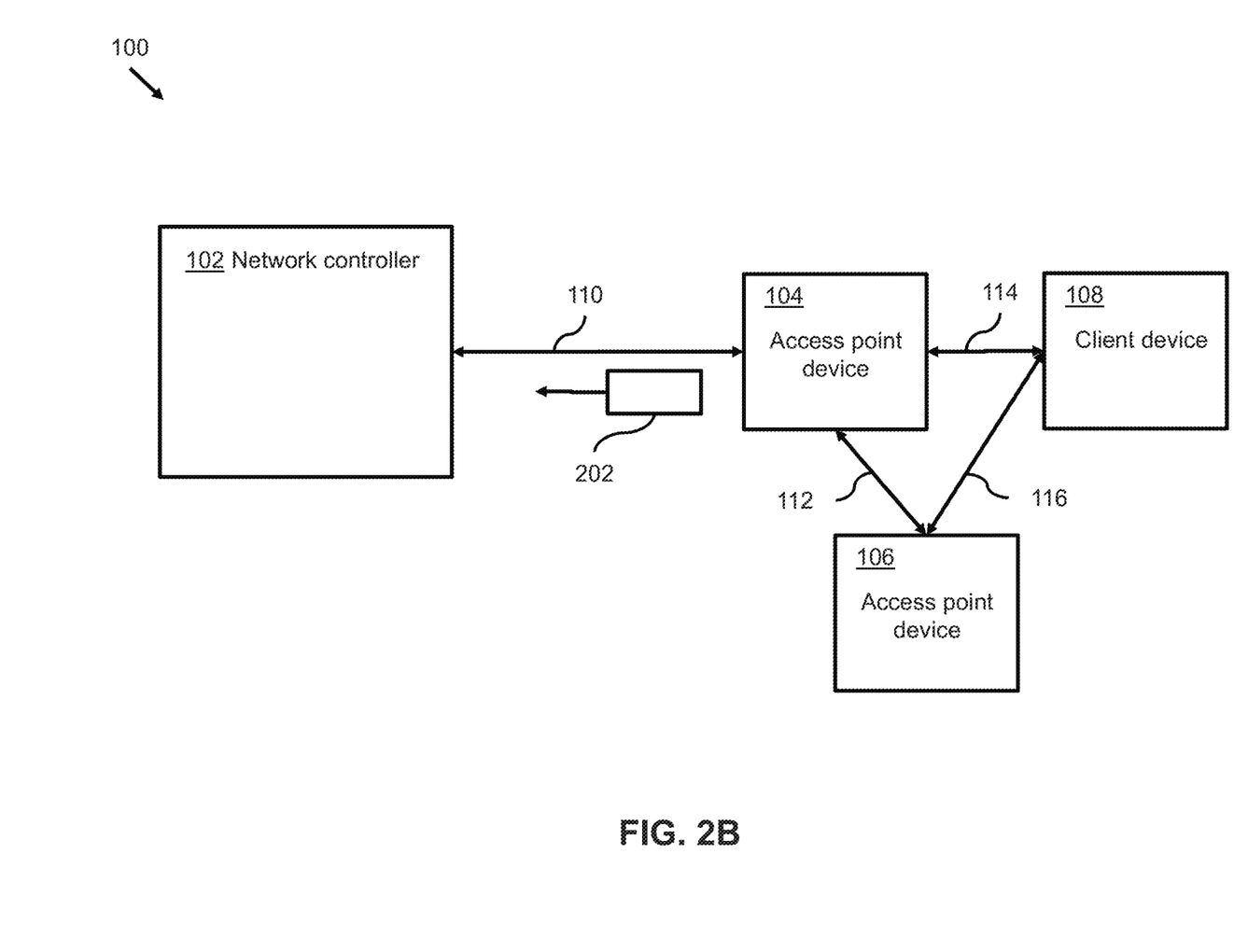

FIG. 1 illustrates components of wireless network 100. Aspects of protocol packets flowing in wireless network 100 will be discussed with reference to FIG. 2.

FIGS. 2A-B illustrate a flow of poll packet 200 and poll response packet 202.

As shown in FIG. 2A, poll packet 200 is sent by network controller 102 on communications channel 110. As shown in FIG. 2B, poll response packet 202 is received by network controller 102 on communications channel 110.

Poll packet 200 is an internet protocol packet sent by network controller 102 to access point devices 104 and 106. Poll response packet 202 is an internet protocol packet sent by access point devices 104 or 106 in response to access point devices 104 or 106 receiving poll packet 200. Poll packet 200 and poll response packet 202 contain internet protocol data that are necessary for the operation and monitoring of wireless network 100.

In operation, network controller 102 periodically sends poll packet 200. Access point device 104 receives poll packet 200 and sends poll response packet 202 to network controller 102 on communications channel 110. Access point device 104 also forwards poll packet 200 to access point device 106 on communications channel 112. Access point device 106 responds to poll packet 200 by sending poll response packet 202 to network controller 102, first on communications channel 112, then on communications channel 110.

FIGS. 2A-B illustrate network controller sending poll packet 200 and receiving poll response packet 202 from access point device 104 or 106. Aspects of sending poll packet 200 and receiving poll response packet 202 will now be discussed with reference to FIG. 3.

Figure 3:
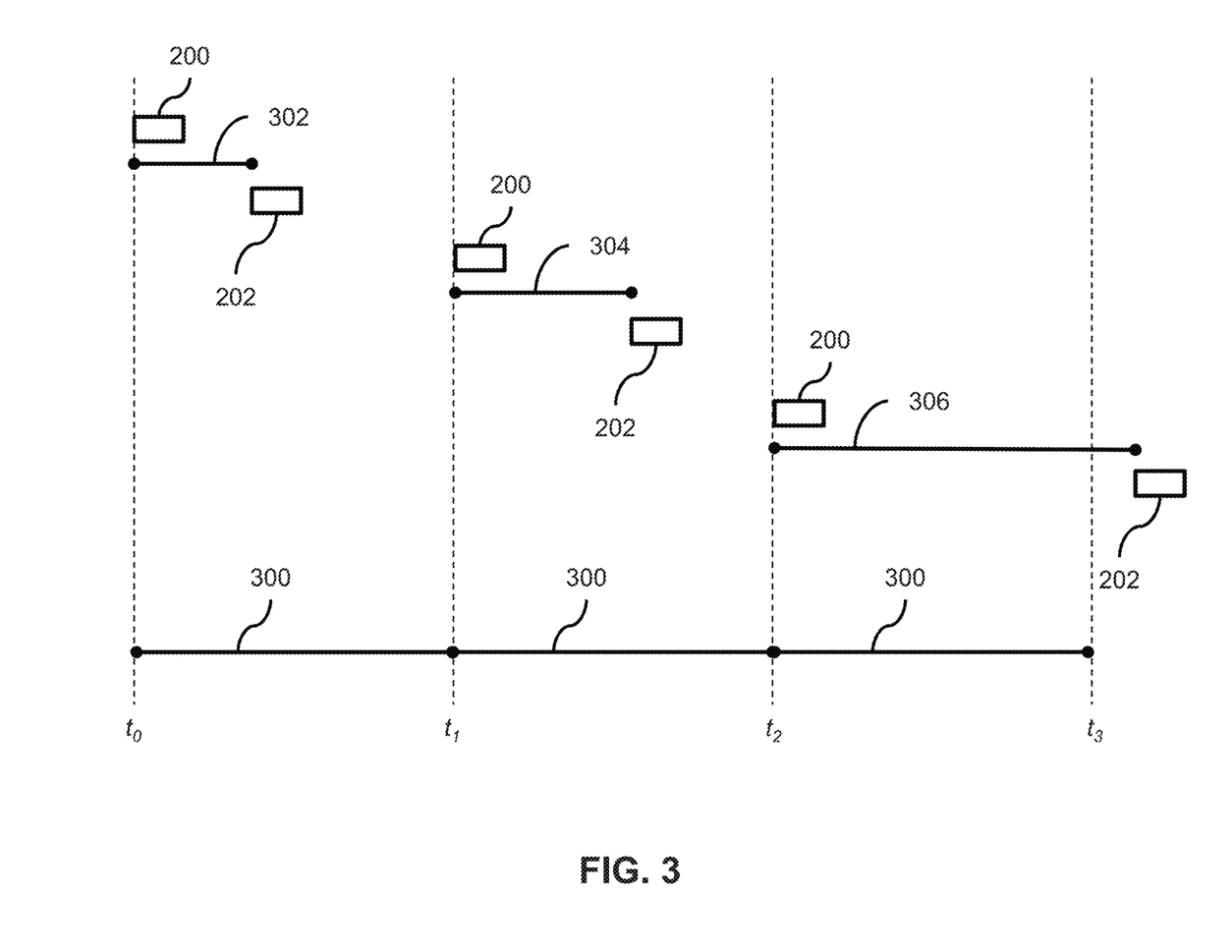
FIG. 3 illustrates a timing diagram of a poll packet and a poll response packet.

FIG. 3 illustrates a timing diagram of poll packet 200 and poll response packet 202.

As shown in the figure, poll packet 200 is sent by network controller 102 at time $t_0$ and poll response packet 202 is received by network controller 102 after an interval of response time 302. Similarly, poll packet 200 is sent at time $t_1$ and poll response packet 202 is received after an interval of response time 304. Similarly, poll packet 200 is sent at time $t_2$ and poll response packet 202 is received after an interval of response time 306. The time intervals $t_1$-$t_0$, $t_2$-$t_1$, and $t_3$-$t_2$ are identical and indicated by period 300, i.e. poll packet 200 is sent by network controller 102 at regular intervals of period 300.

Response time 304 is longer than response time 302, but still shorter than period 300. Response time 306 is longer than period 300, and in this non-limiting example may be the result of too much network traffic, too many hops between access point devices, or fading signal conditions on communication channels 110 or 112.

FIG. 3 illustrates sending poll packet 200 and receiving poll response packet 202 after response time 306, which is longer than period 300, and which may affect performance and quality of service on wireless network 100. A method of prioritizing protocol data including poll packet 200 and poll response packet 202 will now be discussed with reference to FIG. 4.

Figure 4:
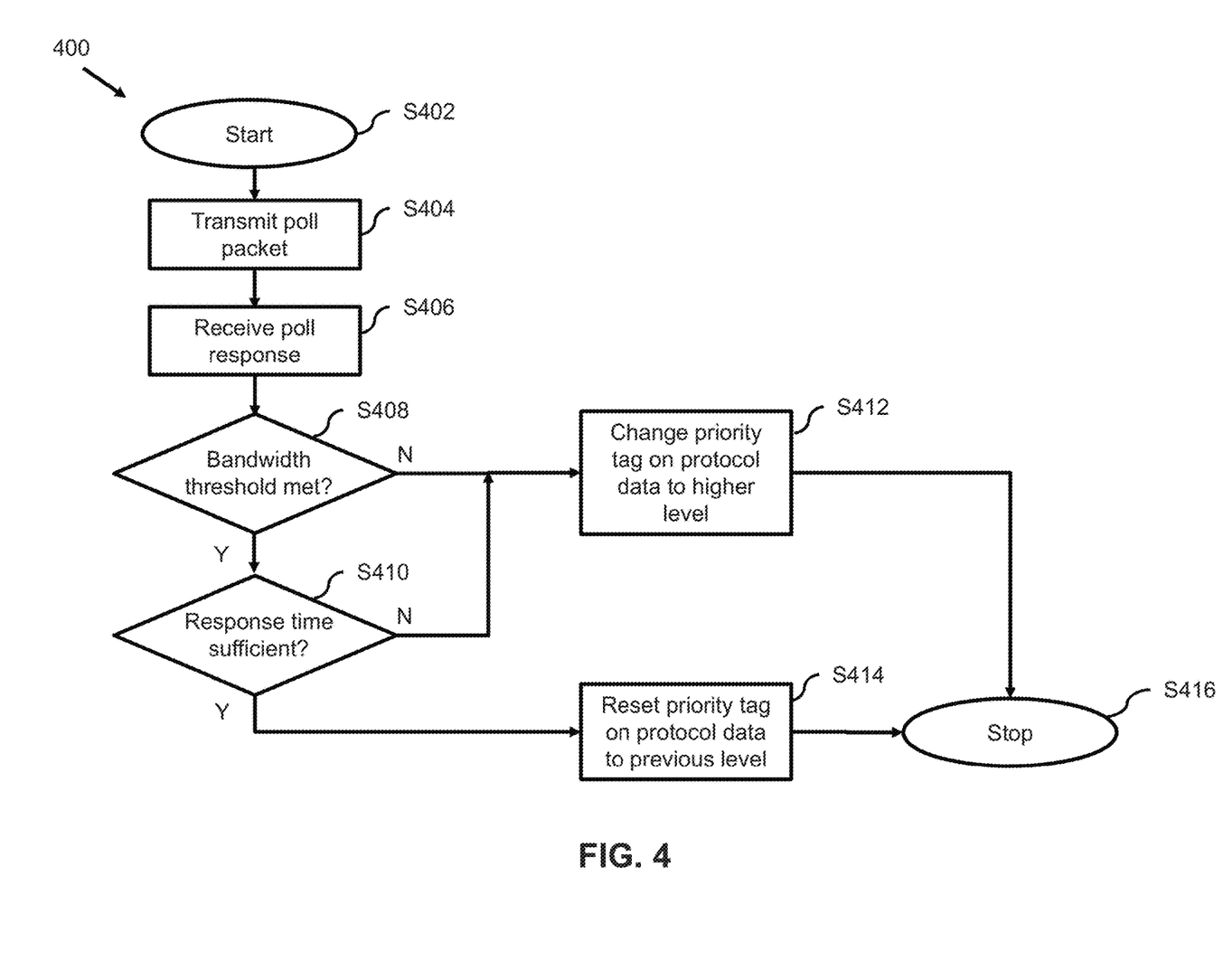
FIG. 4 illustrates an algorithm to be executed by a processor for tagging protocol data with higher priority levels, in accordance with aspects of the present disclosure.

FIG. 4 illustrates an algorithm 400 to be executed by a processor for tagging protocol data with higher priority levels, in accordance with aspects of the present disclosure.

As shown in the figure, algorithm 400 starts (S402) and a poll packet is transmitted (S404). In operation and referring to FIG. 2A, network controller 102 transmits poll packet 200 on communications channel 110. Returning to FIG. 4, a poll response packet is received (S406). In operation and referring to FIG. 2A, poll response packet 202, which may originate from either access point device 104 or access point device 106, is received by network controller 102.

Returning to FIG. 4, channel bandwidth is compared to a certain threshold (S408). This will be discussed in further detail with reference to FIG. 5.

Figure 5:
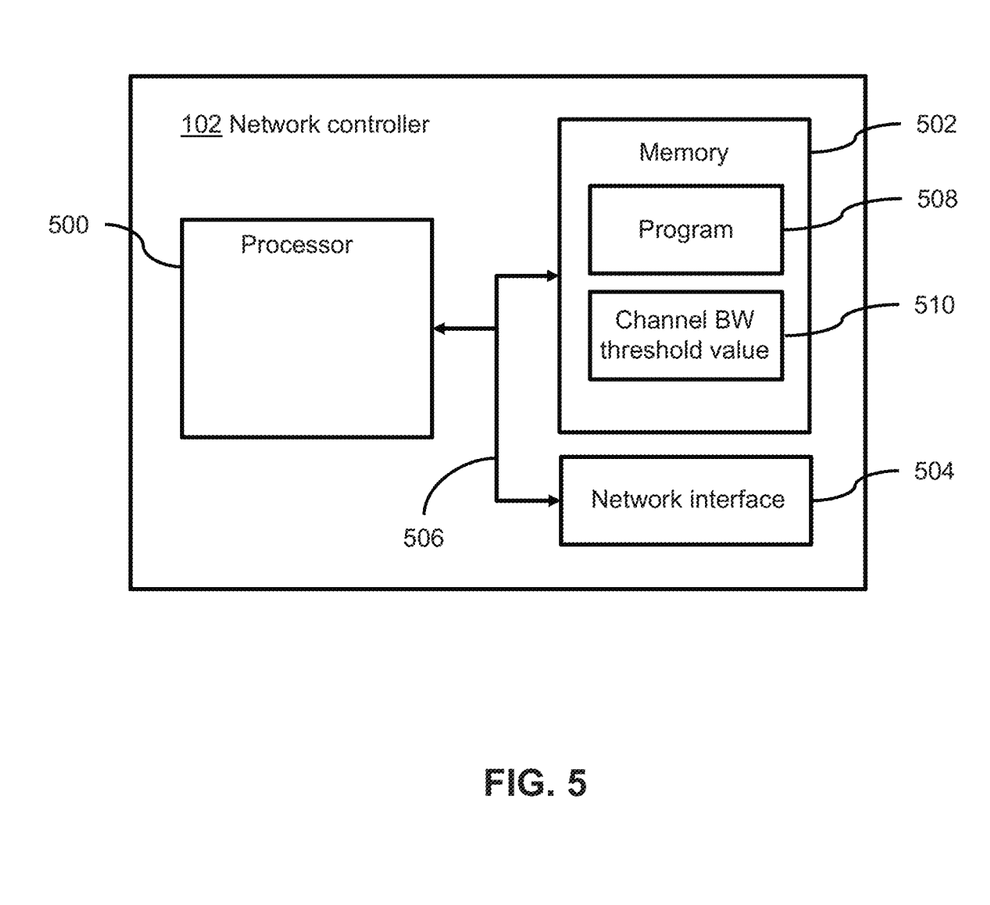
FIG. 5 illustrates a network controller, in accordance with aspects of the present disclosure.

FIG. 5 illustrates network controller 102, in accordance with aspects of the present disclosure.

As shown in the figure, network controller 102 includes processor 500, memory 502, network interface 504, and bus 506. Program 508 is contained in memory 502 and runs on processor 500. Memory 502 additionally has stored therein, a channel bandwidth threshold value 510, which represents the lowest acceptable channel bandwidth.

Processor 500 is any device or system capable of controlling general operations of network controller 102 and includes, but is not limited to, a central processing unit (CPU), a hardware microprocessor, a single core processor, a multi-core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of network controller 102.

Memory 502 is any device or system capable of storing data and instructions used by network controller 102 and includes, but is not limited to, random-access memory (RAM), dynamic random-access memory (DRAM), a hard drive, a solid-state drive, read-only memory (ROM), erasable programmable read-only memory (EPROM), electrically erasable programmable read-only memory (EEPROM), flash memory, embedded memory blocks in an FPGA, or any other various layers of memory hierarchy.

Network interface 504 may also be referred to as a wireless communication circuit, such as a Wi-Fi wireless local area network (WLAN) interface radio transceiver, and is operable to communicate with access point devices 104 and 106. Network interface 504 includes one or more antennas and communicates wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols. Network controller 102 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands, RF4CE protocol, ZigBee protocol, Z-Wave protocol, or IEEE 802.15.4 protocol.

In this example, processor 500, memory 502, and network interface 504 are illustrated as individual devices of network controller 102. However, in some embodiments, at least two of processor 500, memory 502, and network interface 504 may be combined as a unitary device. Further, in some embodiments, at least one of processor 500, memory 502, and network interface 504 may be implemented as a computer having non-transitory computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to processor 500 such that the processor may read information from, and write information to the tangible computer-readable media. In the alternative, the tangible computer-readable media may be integral to processor 500. Processor 500 and the tangible computer-readable media may reside in an integrated circuit (IC), an ASIC, or large scale integrated circuit (LSI), system LSI, super LSI, or ultra LSI components that perform a part or all of the functions described herein. In the alternative, processor 500 and the tangible computer-readable media may reside as discrete components.

Example tangible computer-readable media may be also coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Bus 506 is any device or system that provides data communications between processor 500, memory 502, and network interface 504. Bus 506 can be one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Program 508 controls the operations of network controller 102. Program 508, having a set (at least one) of program modules, may be stored in memory 502 by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Program 508, running on processor 500 of network controller 102, continuously monitors the channel utilizations of communications channels 110 and 112 and compares these with channel bandwidth threshold value 510.

As will be described in greater detail below, in some embodiments, program 508 includes instructions that when executed by processor 500, cause network controller 102 to: periodically poll APD 104 at a first frequency; periodically receive corresponding poll responses from APD 104 in response to the periodic polling; determine whether a channel bandwidth, based on the received corresponding poll responses, is greater than the channel bandwidth threshold value 510; determine whether a response time of a response from APD 104 is greater than a period of the first frequency; and instruct APD 104 to tag internet protocol data to be transmitted to network controller 102 with the second priority level tag when at least one of the channel bandwidth is less than the channel bandwidth threshold value 104 and the response time is greater than the period of the first frequency.

As will be described in greater detail below, in some embodiments, program 508 includes instructions that when executed by processor 500, additionally cause network controller 102 to tag internet protocol data to be transmitted to APD 104 with the second priority level tag when at least one of the channel bandwidth is less than channel bandwidth threshold value 510 and the response time is greater than the period of the first frequency.

As will be described in greater detail below, in some embodiments, program 508 includes instructions that when executed by processor 500, additionally cause network controller 102 to instruct APD 104 to tag internet protocol data to be transmitted to network controller 102 via a wireless multi-media quality of service mechanism, wherein the first priority level tag comprises one of the group consisting of a background level tag having a background level of priority, a best effort level tag having a best effort level of priority that is higher than the background level of priority, and a video level tag having a video level of priority that is higher than the best effort level of priority, and wherein the second priority level tag comprises one of the group consisting of the best effort level tag, and the video level tag, and a voice level tag having a voice level of priority that is higher than the video level of priority.

As will be described in greater detail below, in some embodiments, program 508 includes instructions that when executed by processor 500, additionally cause network controller 102 to instruct the APD 104 to tag internet protocol data to be transmitted to network controller 102 via a differentiated services code point mechanism.

Returning to FIG. 4, if channel utilization does not exceed channel bandwidth threshold value 510 (Y on S408), then the packet response time is compared with period 300 (S410).

If channel utilization exceeds channel bandwidth threshold value 510 (N on S408) or packet response time is greater than period 300 (N on S410), then protocol data is given a higher priority level (S412). Assigning a higher priority level to data packets may be accomplished with any number of methods. In this example embodiment, assigning a higher priority level is accomplished through the use of WMM tags in data frames. In another example embodiment, assigning a higher priority level is accomplished through the use of DSCP tags in data packets. These will be discussed in greater detail with reference to FIGS. 6-7.

Figure 6:
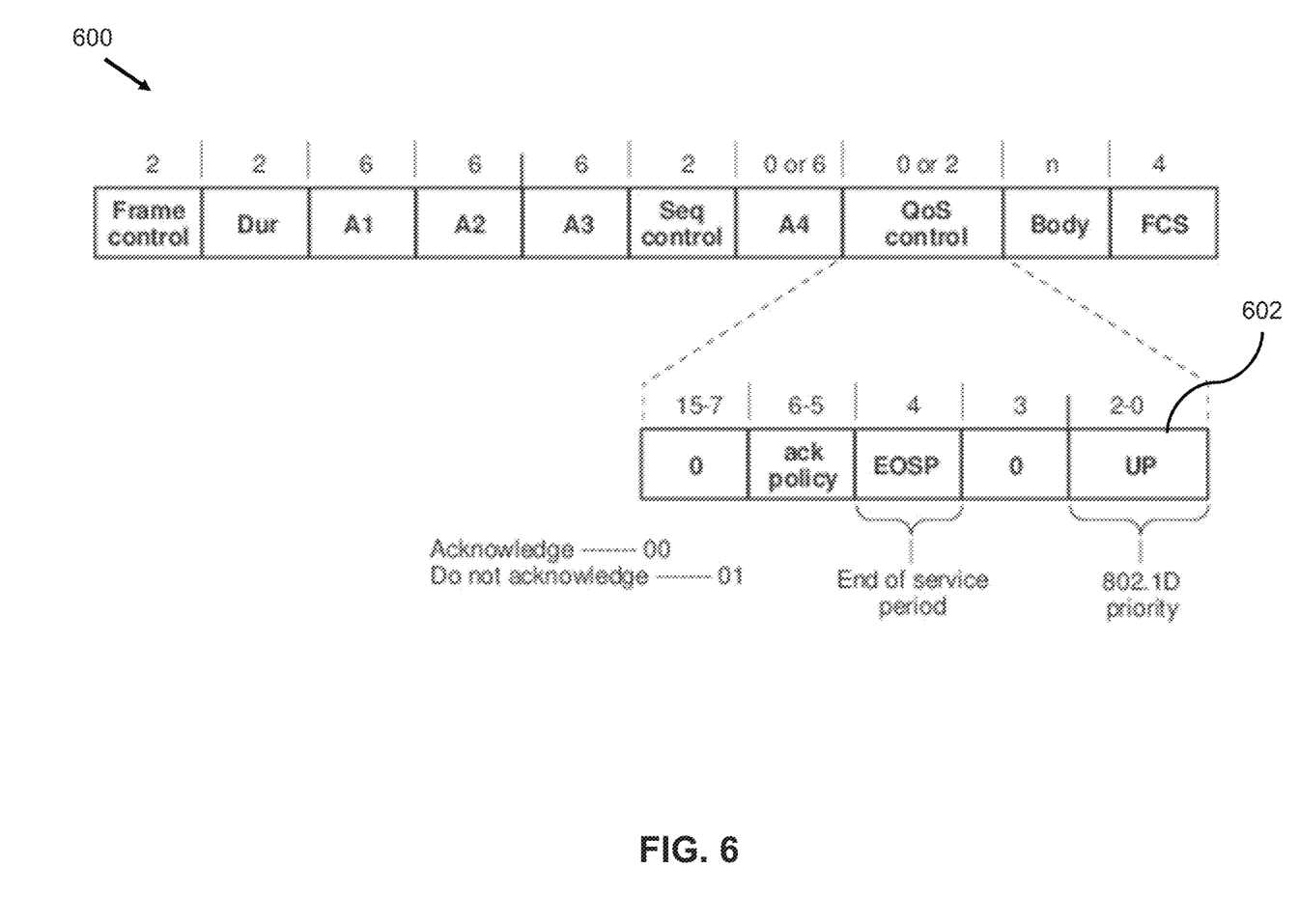
FIG. 6 illustrates a data frame with a WMM priority tag, in accordance with aspects of the present disclosure.

FIG. 6 illustrates data frame 600 with WMM priority tag 602, in accordance with aspects of the present disclosure.

As shown in the figure, data frame 600 is a digital data transmission unit that contains WMM priority tag 602. WMM priority levels are based on the IEEE 802.1D-1998 standard and comprise, from lowest priority to highest priority: Background, Best Effort, Video, and Voice. In normal operation, most data frames have a default WMM priority level of Background. An application on client device 108 may choose a different WMM priority level; for example, a multimedia application on client device 108 may tag its data frames with WMM priority level of Video.

Returning to FIG. 4, protocol data is given a higher priority level (S412) when network controller 102 detects bandwidth constraints or long packet response times. In operation and referring to FIGS. 5-6, processor 500 of network controller 102 changes tag 602 in poll packet 200 to Voice. Network controller 102 also instructs access point devices 104 and 106 to change tag 602 in poll response packet 202 to Voice. Tagging poll packet 200 and poll response packet 202 with Voice, the highest WMM priority level, increases the likelihood that poll response packet 202 is received by network controller 102 in a timely manner.

In another example embodiment, the changing of priority levels is accomplished using DSCP tags. This will be discussed with reference to FIG. 7.

Figure 7:
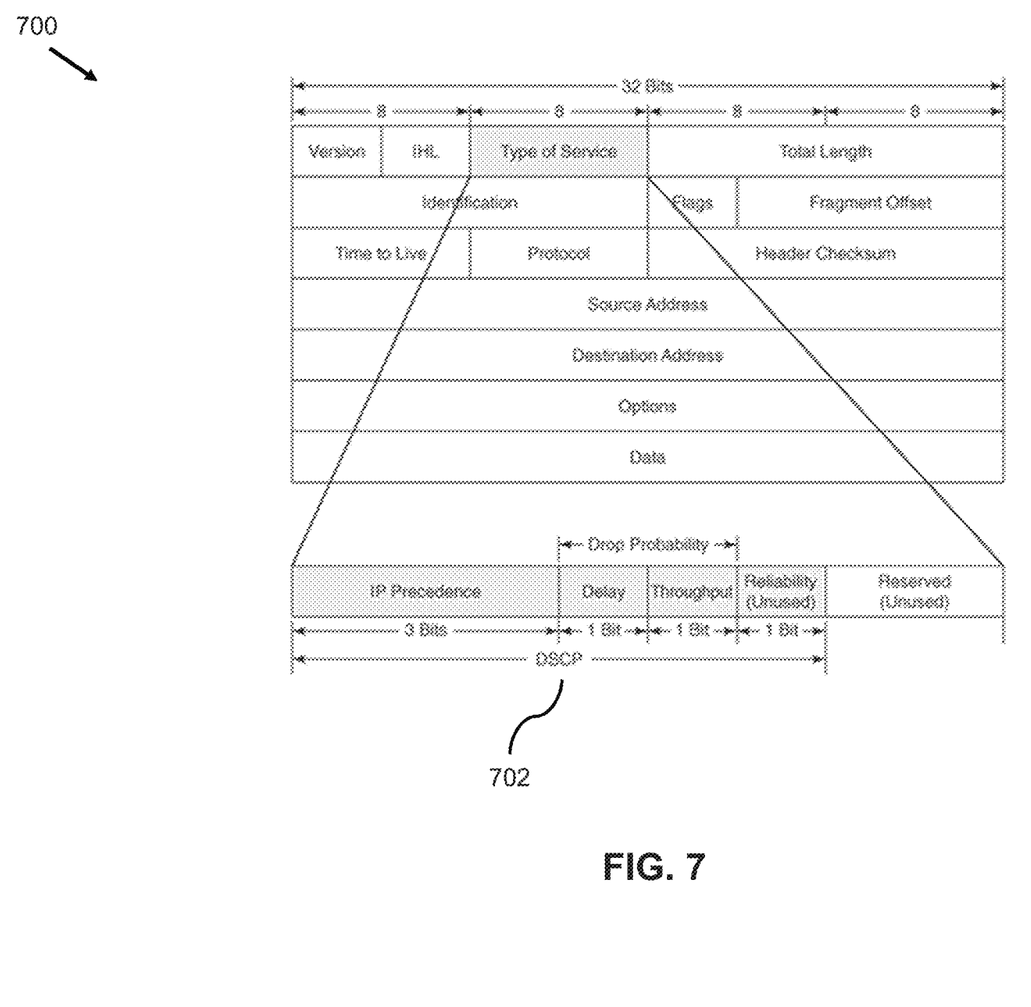
FIG. 7 illustrates a data packet with a DSCP priority tag, in accordance with aspects of the present disclosure.

FIG. 7 illustrates data packet 700 with DSCP priority tag 702, in accordance with aspects of the present disclosure.

As shown in the figure, data packet 700 is a digital data transmission unit that contains DSCP priority tag 702. DSCP priority levels range from CS0 (lowest priority, decimal 0, binary 000 000) to CS7 (highest priority, decimal 56, binary 111 000). For example, standard data traffic may be set at CS0; broadcast video may be set at CS3 (decimal 24, binary 011 000); multimedia conferencing may be set at AF41 (decimal 34, binary 100 010); and police telephony may be set at EF (decimal 46, binary 101 110). In normal operation, most data packets have a default DSCP priority level of CS0. An application on client device 108 may choose a different DSCP priority level; for example, a multimedia application on client device 108 may tag its data packets with DSCP priority level of AF41.

Returning to FIG. 4, protocol data is given a higher priority level (S412) when network controller 102 detects bandwidth constraints or long packet response times. In operation and referring to FIGS. 5 and 7, processor 500 of network controller 102 changes tag 702 in poll packet 200 to CS7. Network controller 102 also instructs access point devices 104 and 106 to change tag 702 in poll response packet 202 to CS7. Tagging poll packet 200 and poll response packet 202 with CS7, the highest DSCP priority level, increases the likelihood that poll response packet 202 is received by network controller 102 in a timely manner.

Returning to FIG. 4, after protocol data is raised to a higher priority level (S412), algorithm 400 stops (S416).

If channel utilization is low enough (Y on S408) and poll packet response times are short enough (Y on S410), then priority tags on protocol data are reset to their default or previous values (S414). In operation and referring to FIGS. 5-7, network controller 102 resets tag 602 or tag 702 on poll packet 200 to its default or previous value. Access point devices 104 or 106 also reset tag 602 or tag 702 on poll response packet 202 to its default or previous value. Algorithm 400 then stops (S416).

Today's homes and offices often have wireless networks to connect client devices and Internet resources. Some wireless networks employ multiple network devices to provide better wireless coverage and support more client devices. In certain situations, network congestion and other constraints can slow the communication of protocol data between network devices. As the timely communication of protocol data is necessary for the efficient operation of the wireless network, these slowdowns can affect the performance and quality of service of client devices using the wireless network.

In accordance with the present disclosure, a network controller periodically sends poll packets to and receives poll response packets from access point devices in its wireless network. The network controller monitors response times of the poll response packets. The network controller also monitors channel bandwidth on the wireless network. If response times exceed a certain period or channel bandwidth falls below a threshold value, the network controller and access point devices increase the priority of protocol data by tagging the protocol data with a higher priority level. When response times or channel bandwidth returns to acceptable levels, priority tags are reset to their previous or default levels. Thus, the present disclosure provides a system and method of improving the response time of protocol data in a wireless network.

The foregoing description of various preferred embodiments have been presented for purposes of illustration and description. It is not intended to be exhaustive or to limit the present disclosure to the precise forms disclosed, and obviously many modifications and variations are possible in light of the above teaching. The example embodiments, as described above, were chosen and described in order to best explain the principles of the present disclosure and its practical application to thereby enable others skilled in the art to best utilize the present disclosure in various embodiments and with various modifications as are suited to the particular use contemplated. It is intended that the scope of the present disclosure be defined by the claims appended hereto.

What is claimed is:

1. A network controller for use with a first Wi-Fi access point device (APD) and a client device, the client device being associated with the first Wi-Fi APD, the first Wi-Fi APD being configured to tag internet protocol data with a first priority level tag that indicates a first level of priority, and to tag internet protocol data with a second priority level tag that indicates a second level of priority that is higher than the first level of priority, said network controller comprising:
- a memory having a channel bandwidth threshold value stored therein; and
- a processor configured to execute instructions stored on said memory to cause said network controller to:
  - periodically poll the first Wi-Fi APD at a first frequency;
  - periodically receive corresponding poll responses from the first Wi-Fi APD in response to the periodic polling;
  - determine whether a channel bandwidth, based on the received corresponding poll responses, is greater than the channel bandwidth threshold value;
  - determine whether a response time of a response from the first Wi-Fi APD is greater than a period of the first frequency; and
  - instruct the first Wi-Fi APD to tag internet protocol data to be transmitted to said network controller with the second priority level tag when at least one of the channel bandwidth is less than the channel bandwidth threshold value and the response time is greater than the period of the first frequency.

2. The network controller of claim 1, wherein said processor is configured to execute instructions stored on said memory to additionally cause said network controller to tag internet protocol data to be transmitted to the first Wi-Fi APD with the second priority level tag when at least one of the channel bandwidth is less than the channel bandwidth threshold value and the response time is greater than the period of the first frequency.

3. The network controller of claim 1,
wherein said processor is configured to execute instructions stored on said memory to additionally cause said network controller to instruct the first Wi-Fi APD to tag internet protocol data to be transmitted to said network controller via a wireless multi-media quality of service mechanism,
wherein the first priority level tag comprises one of the group consisting of a background level tag having a background level of priority, a best effort level tag having a best effort level of priority that is higher than the background level of priority, and a video level tag having a video level of priority that is higher than the best effort level of priority, and
wherein the second priority level tag comprises one of the group consisting of the best effort level tag, and the video level tag, and a voice level tag having a voice level of priority that is higher than the video level of priority.

4. The network controller of claim 1,
wherein said processor is configured to execute instructions stored on said memory to additionally cause said network controller to instruct the first Wi-Fi APD to tag internet protocol data to be transmitted to said network controller via a differentiated services code point mechanism.

5. A method of using a network controller with a first Wi-Fi access point device (APD) and a client device, the client device being associated with the first Wi-Fi APD, the first Wi-Fi APD being configured to tag internet protocol data with a first priority level tag that indicates a first level of priority, and to tag internet protocol data with a second priority level tag that indicates a second level of priority that is higher than the first level of priority, said method comprising:
- periodically polling, via a processor configured to execute instructions stored on a memory having a channel bandwidth threshold value stored therein, the first Wi-Fi APD at a first frequency;
- periodically receiving, via the processor, corresponding poll responses from the first Wi-Fi APD in response to the periodic polling;
- determining, via the processor, whether a channel bandwidth, based on the received corresponding poll responses, is greater than the channel bandwidth threshold value;
- determining, via the processor, whether a response time of a response from the first Wi-Fi APD is greater than a period of the first frequency; and
- instructing, via the processor, the first Wi-Fi APD to tag internet protocol data to be transmitted to the network controller with the second priority level tag when at least one of the channel bandwidth is less than the channel bandwidth threshold value and the response time is greater than the period of the first frequency.

6. The method of claim 5, further comprising tagging, via the processor, internet protocol data to be transmitted to the first Wi-Fi APD with the second priority level tag when at least one of the channel bandwidth is less than the channel bandwidth threshold value and the response time is greater than the period of the first frequency.

7. The method of claim 5,
wherein said instructing, via the processor, the first Wi-Fi APD to tag internet protocol data to be transmitted to the network controller comprises instructing the first Wi-Fi APD to tag internet protocol data to be transmitted to the network controller via a wireless multi-media quality of service mechanism,
wherein the first priority level tag comprises one of the group consisting of a background level tag having a background level of priority, a best effort level tag having a best effort level of priority that is higher than the background level of priority, and a video level tag having a video level of priority that is higher than the best effort level of priority, and
wherein the second priority level tag comprises one of the group consisting of the best effort level tag, and the video level tag, and a voice level tag having a voice level of priority that is higher than the video level of priority.

8. The method of claim 5,
wherein said instructing, via the processor, the first Wi-Fi APD to tag internet protocol data to be transmitted to the network controller comprises instructing the first Wi-Fi APD to tag internet protocol data to be transmitted to the network controller via a differentiated services code point mechanism.

9. A non-transitory, computer-readable media having computer-readable instructions stored thereon, the computer-readable instructions being capable of being read by a network controller with a first Wi-Fi access point device (APD) and a client device, the client device being associated with the first Wi-Fi APD, the first Wi-Fi APD being configured to tag internet protocol data with a first priority level tag that indicates a first level of priority, and to tag internet protocol data with a second priority level tag that indicates a second level of priority that is higher than the first level of priority, wherein the computer-readable instructions are capable of instructing the network controller to perform the method comprising:
- periodically polling, via a processor configured to execute instructions stored on a memory having a channel bandwidth threshold value stored therein, the first Wi-Fi APD at a first frequency;
- periodically receiving, via the processor, corresponding poll responses from the first Wi-Fi APD in response to the periodic polling;
- determining, via the processor, whether a channel bandwidth, based on the received corresponding poll responses, is greater than the channel bandwidth threshold value;
- determining, via the processor, whether a response time of a response from the first Wi-Fi APD is greater than a period of the first frequency; and
- instructing, via the processor, the first Wi-Fi APD to tag internet protocol data to be transmitted to the network controller with the second priority level tag when at least one of the channel bandwidth is less than the channel bandwidth threshold value and the response time is greater than the period of the first frequency.

10. The non-transitory, computer-readable media of claim 9, wherein the computer-readable instructions are capable of instructing the network controller to perform the method further comprising tagging, via the processor, internet protocol data to be transmitted to the first Wi-Fi APD with the second priority level tag when at least one of the channel bandwidth is less than the channel bandwidth threshold value and the response time is greater than the period of the first frequency.

11. The non-transitory, computer-readable media of claim 9, wherein the computer-readable instructions are capable of instructing the network controller to perform the method wherein said instructing, via the processor, the first Wi-Fi APD to tag internet protocol data to be transmitted to the network controller comprises instructing the first Wi-Fi APD to tag internet protocol data to be transmitted to the network controller via a wireless multimedia quality of service mechanism,
wherein the first priority level tag comprises one of the group consisting of a background level tag having a background level of priority, a best effort level tag having a best effort level of priority that is higher than the background level of priority, and a video level tag having a video level of priority that is higher than the best effort level of priority, and
wherein the second priority level tag comprises one of the group consisting of the best effort level tag, and the video level tag, and a voice level tag having a voice level of priority that is higher than the video level of priority.

12. The non-transitory, computer-readable media of claim 9, wherein the computer-readable instructions are capable of instructing the network controller to perform the method wherein said instructing, via the processor, the first Wi-Fi APD to tag internet protocol data to be transmitted to the network controller comprises instructing the first Wi-Fi APD to tag internet protocol data to be transmitted to the network controller via a differentiated services code point mechanism.

* * * * *